US012789629B2

(12) United States Patent
Tan et al.

(10) Patent No.: US 12,789,629 B2
(45) Date of Patent: Nov. 10, 2026

(54) EXTENDED POWER SUPPLY ON WORK MACHINES

(71) Applicant: Oshkosh Corporation, Oshkosh, WI (US)

(72) Inventors: Peter Z. Tan, Oshkosh, WI (US); Louis A. Bafile, Oshkosh, WI (US); Abednego A. Soita, Oshkosh, WI (US); Matthew Planzos, Oshkosh, WI (US); Mark Nguyen, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/253,475

(22) Filed: Jun. 27, 2025

(65) Prior Publication Data

US 2026/0001405 A1 Jan. 1, 2026

Related U.S. Application Data

(60) Provisional application No. 63/665,394, filed on Jun. 28, 2024.

(51) Int. Cl.

| | |
|---|---|
| ***B60L 1/00*** | (2006.01) |
| ***B60L 50/60*** | (2019.01) |
| ***B60L 58/18*** | (2019.01) |
| ***H02J 7/00*** | (2026.01) |
| ***H02J 7/34*** | (2006.01) |

(52) U.S. Cl.

CPC ........... *B60L 1/006* (2013.01); *B60L 2200/40* (2013.01)

(58) Field of Classification Search

CPC .... B60L 1/00; B60L 1/006; B60L 1/14; B60L 1/16; B60L 1/20; B60L 2200/40

USPC ........................................................ 74/11, 477

See application file for complete search history.

(56) References Cited

U.S. PATENT DOCUMENTS

| | | | | |
|---|---|---|---|---|
| 12,559,893 | B2 * | 2/2026 | Erdtmann | E01C 19/48 |
| 2020/0317489 | A1 | 10/2020 | Bhatia et al. | |
| 2023/0264937 | A1 | 8/2023 | Hoover | |
| 2024/0075815 | A1 | 3/2024 | Koga et al. | |
| 2024/0116705 | A1 | 4/2024 | Koga et al. | |
| 2024/0149717 | A1 * | 5/2024 | Hendrickson | B60L 50/53 |
| 2025/0128611 | A1 * | 4/2025 | Robinson | B60L 50/60 |
| 2025/0341306 | A1 * | 11/2025 | Berg | B25H 5/00 |
| 2026/0116718 | A1 * | 4/2026 | Rohr | B66F 9/0655 |

FOREIGN PATENT DOCUMENTS

| | | | | |
|---|---|---|---|---|
| WO | WO-2011058699 A1 * | 5/2011 | | E02F 9/207 |

OTHER PUBLICATIONS

Description Translation for WO 2011058699 from Espacenet (Year: 2011).*

International Search Report and Written Opinion issued in PCT/US2025/035774 dated Nov. 5, 2025.

* cited by examiner

*Primary Examiner* — Daniel M. Keck

(74) *Attorney, Agent, or Firm* — Foley & Lardner LLP

(57) ABSTRACT

A work vehicle may include a first power supply located on a base portion of the vehicle and a second power supply located on a remote portion of the vehicle, such as a boom platform. The second power supply is electrically coupled to one or more devices positioned on the remote portion and is configured to provide electrical power during periods of peak demand. The second power supply may be recharged by the first power supply via an electrically conductive connector during periods of reduced demand.

8 Claims, 8 Drawing Sheets

EXTENDED POWER SUPPLY ON WORK MACHINES

CROSS-REFERENCE TO RELATED PATENT APPLICATIONS

This application claims the benefit of and priority to U.S. Provisional Patent Application No. 63/665,394, filed Jun. 28, 2024, the disclosure of which is incorporated by reference herein in its entirety.

BACKGROUND

Providing power to remote portions of work vehicles has proven to be difficult, particularly when a work vehicle includes extendable and/or articulable members, such as an elevated work platform. Work machines generate and/or store electrical power on the chassis of the vehicle and route the generated/stored electrical power from the chassis to the remote portion of the work vehicle through electrical conductors to be used directly by one or more energy-demanding devices. As electrical power requirements of these devices increase, larger electrical conductors must be used to supply the required current to the device, particularly as the distance to the remote portion of the work vehicle increases due to power loss over the extended distance. Larger electrical conductors and connections increase costs and weight while decreasing the routability of the increased-diameter conductors. Increased cable diameters to meet the power needs at the remote portion of the work vehicle makes cable routing difficult due to restricted bending radius requirements. Additionally, the chain effect of weight escalation in the cable, boom structures, counterweights, chassis, etc., becomes problematic. As such, increasing electrical power requirements of devices at remote portions of work vehicles demands an improved power supply.

SUMMARY

In some embodiments, a vehicle, such as an aerial work platform, includes both (a) a secondary power supply (e.g., a battery) that is provided at a remote portion of the vehicle (e.g., on a platform or at the end of a boom) and (b) a primary power supply that is located remote from the secondary power supply (e.g., on a chassis of the work vehicle, on/in an articulable member of the work vehicle, a power bank exterior to the work vehicle). In so doing, the secondary power supply may provide electrical power to energy-demanding devices at remote locations during peak power usage (e.g., situations that would traditionally require large-diameter conductors), while the secondary power supply can be recharged over time by the primary power supply using smaller electrical conductors and connections.

In some aspects, the techniques described herein relate to a system for providing electrical power to a device positioned on a remote portion of a work vehicle including: the device; a first power supply; a second power supply electrically coupled to the device at the remote portion of the work vehicle; and an electrically conductive connector coupled to the first power supply and the second power supply and configured to facilitate charging of the second power supply from the first power supply.

In some aspects, the techniques described herein relate to a system, the work vehicle including: a chassis; a prime mover coupled to the first power supply; a tractive member coupled to the chassis; and an articulable member, wherein the remote portion of the work vehicle is, or coupled to, the articulable member.

In some aspects, the techniques described herein relate to a system, wherein the first power supply is coupled to the chassis and the second power supply is coupled to the articulable member.

In some aspects, the techniques described herein relate to a system, further including an auxiliary component coupled to a distal end of the articulable member.

In some aspects, the techniques described herein relate to a system, wherein the auxiliary component is one of a work platform, a work attachment, a tool attachment, and a lighting device.

In some aspects, the techniques described herein relate to a system, wherein the second power supply is coupled to the auxiliary component.

In some aspects, the techniques described herein relate to a system, wherein the second power supply provides electrical power to the device for peak electrical loads and the first power supply provides electrical power to the second power supply to charge the second power supply upon a reduction in an electrical charge of the second power supply below a threshold.

In some aspects, the techniques described herein relate to a system, wherein the device is one of a control module, a display screen, a hydraulic valve, a light, a sensor, a tool, an actuator, a horn, a beacon, a welder, and an electrical plug.

In some aspects, the techniques described herein relate to a system, wherein the device is electrically coupled to the first power supply and the second power supply.

In some aspects, the techniques described herein relate to a system, wherein the second power supply is operable when the first power supply is operating or not operating.

In some aspects, the techniques described herein relate to a work vehicle including: a chassis; a first power supply; a prime mover coupled to the first power supply; a device; a second power supply electrically coupled to the device at a remote portion of the work vehicle; an articulable member, wherein the remote portion of the work vehicle is, or coupled to, the articulable member; and an electrically conductive connector coupled the second power supply to the first power supply.

In some aspects, the techniques described herein relate to a work vehicle, wherein the second power supply is configured to receive electrical current from the first power supply for charging the second power supply in response to an electrical charge of the second power supply falling below a threshold.

In some aspects, the techniques described herein relate to a work vehicle, further including a second electrically conductive connecter coupled from the second power supply to the device, wherein the second electrically conductive connector has a higher voltage rating than the electrically conductive connector.

In some aspects, the techniques described herein relate to a work vehicle, wherein the device is electrically coupled to the first power supply to provide power to the device during off-peak operation, and wherein the device is electrically coupled to the second power supply to provide power to the device during peak operation.

In some aspects, the techniques described herein relate to a work vehicle, wherein the second power supply is coupled to a distal end of the articulable member.

In some aspects, the techniques described herein relate to a work vehicle, further including a work platform coupled to a distal end of the articulable member, wherein the device is coupled to the work platform.

In some aspects, the techniques described herein relate to a work vehicle including: a chassis; a tractive element; an articulating boom having a first end coupled to the chassis; a platform assembly coupled to the articulating boom at a second end; a device coupled to the platform assembly; a first power supply coupled to the chassis and configured to power at least the tractive element; and a second power supply coupled to the articulating boom and configured to power at least the device, wherein the second power supply is electrically coupled to the first power supply by a first electrically conductive connector, and wherein the first power supply charges the second power supply by the first electrically conductive connector.

In some aspects, the techniques described herein relate to a work vehicle, wherein the second power supply is configured to removably couple with a third power supply external to the work vehicle to electrically charge the second power supply.

In some aspects, the techniques described herein relate to a work vehicle, further including a second electrically conductive connector electrically coupling the second power supply to the device, the second electrically conductive connector having a higher voltage rating than the first electrically conductive connector.

In some aspects, the techniques described herein relate to a work vehicle, wherein the second power supply is configured to provide electrical power to the device independent of an operating state of the first power supply.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
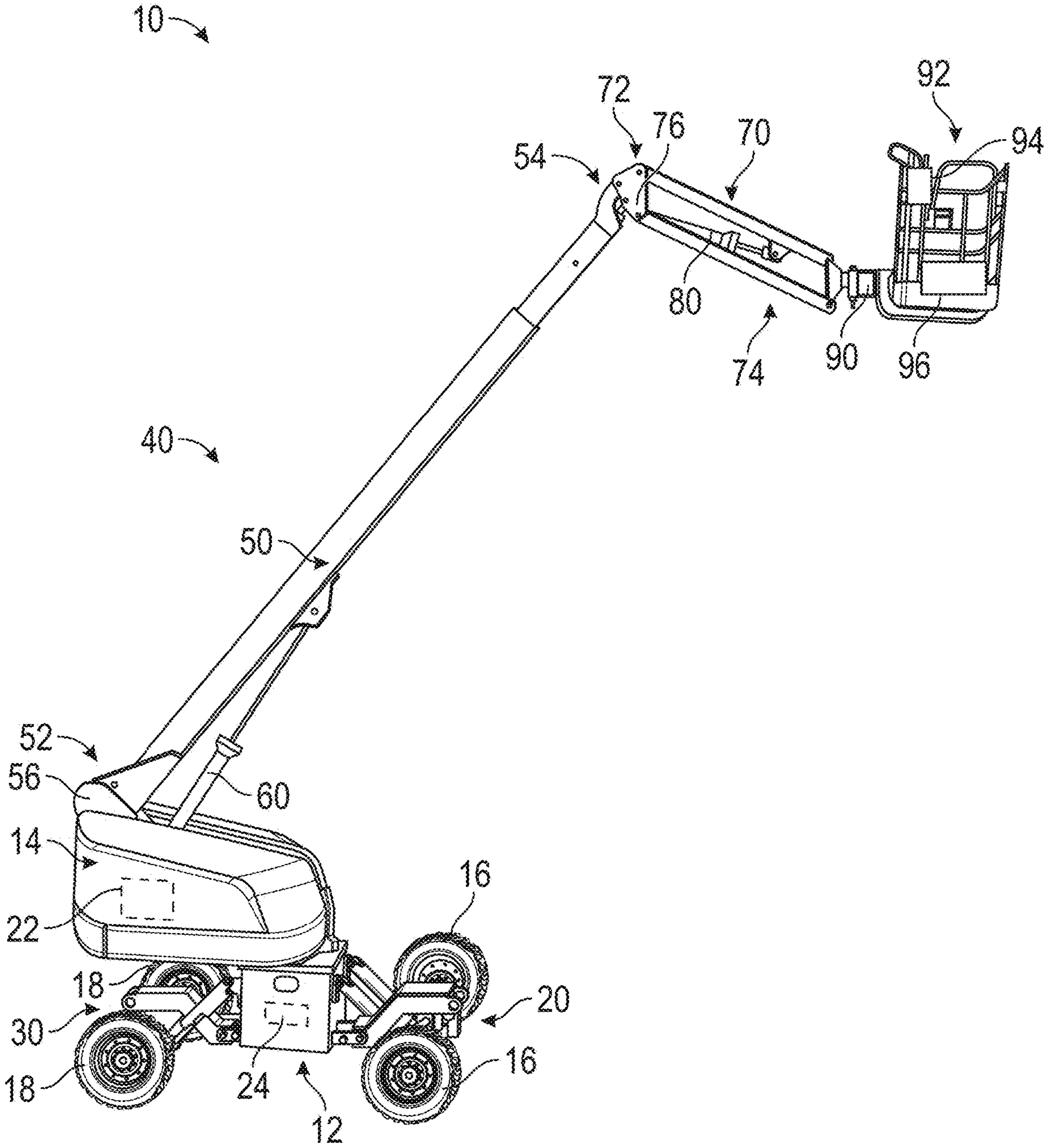
FIG. 1 depicts a side, perspective view of a vehicle in the form of a boom lift, according to an exemplary embodiment.

Before turning to the figures, which illustrate the exemplary embodiments in detail, it should be understood that the present application is not limited to the details or methodology set forth in the description or illustrated in the figures. It should also be understood that the terminology used herein is for the purpose of description only and should not be regarded as limiting.

Providing electrical power to an elevated platform of an aerial work platform (AWP) presents longstanding engineering challenges. As platforms are positioned higher on increasingly long and articulating booms, the electrical conductors supplying power must also be longer. This results in greater voltage drop, signal degradation, and power instability at the platform, especially during peak electrical load conditions. To meet growing demand for onboard devices—such as sensors, lighting, displays, and control modules—manufacturers have conventionally responded by increasing conductor diameter to carry higher currents. However, this introduces drawbacks, including reduced flexibility, increased routing difficulty due to tighter bending radius requirements, and escalating weight throughout the boom, chassis, and counterbalance systems. The leverage effect of platform weight leads to disproportionate structural and cost burdens at the vehicle chassis.

The disclosed invention addresses these problems by augmenting the existing vehicle power supply with a lightweight power supply (e.g., a lithium-ion battery) mounted at or near the boom platform. This secondary power source acts as a local energy buffer, capable of supplying peak current demands directly to the platform-mounted devices without routing the full load through long conductors from the main chassis. By supporting opportunity charging from the primary power supply during low-demand periods, the system—in at least some embodiments—reduces the required conductor size, improves power quality and stability, and—eliminates the cascading weight and structural burdens associated with conventional solutions.

Referring generally to the figures, the present disclosure relates to a work vehicle (also referred to herein as a "vehicle") with extended power supplies for providing electrical power to one or more extended/remote portions of the vehicle. For example, in at least one embodiment, the vehicle may include one or more extended members, such as a boom, scissor lift, forks, work platform, and/or access ladder. At times, electrical power is desired at the extended members, which are remote from a primary power supply (also referred to herein as a "first power supply") (e.g., a battery, an engine, an alternator, a generator, a hydrogen fuel cell), which can be housed on the main chassis of the vehicle. To provide the desired electrical power at the extended members, a secondary power supply (also referred to herein as a "secondary power supply") (e.g., a battery, an engine, an alternator, a generator, a hydrogen fuel cell, etc.) may be located on or near the extended member.

For example, a primary power supply (a battery) may be located on a main chassis of a vehicle that includes a work platform coupled to a distal end of a boom. To supply electrical power to the work platform, a secondary power supply is located on the work platform to supply electrical power to various devices during peak electrical loads or demands. The secondary power supply may be electrically coupled to the primary power supply to be charged by the primary power supply during off-peak demand. Because the primary power supply does not need to supply the peak power demand when it is needed, smaller, lighter, and/or more routable electrical conductors may be used to electrically couple the primary power supply to the secondary power supply.

According to the exemplary embodiment shown in FIG. 1, a lift device (e.g., an aerial work platform, a telehandler, a boom lift, a scissor lift, etc.), shown as vehicle 10, includes a chassis, shown as lift base 12. As shown, the vehicle 10 is configured as a boom lift or aerial work platform. In other embodiments, the vehicle 10 is another type of vehicle (e.g., a fire apparatus, a military vehicle, an airport rescue fire fighting ("ARFF") truck, a boom truck, a refuse vehicle, a fork lift, etc.). The lift base 12 supports a rotatable structure, shown as turntable 14, and a boom assembly or lift assembly, shown as articulable member 40. According to an exemplary embodiment, the turntable 14 is rotatable relative to the lift base 12. According to an exemplary embodiment, the turntable 14 includes a counterweight 22 positioned at a rear of the turntable 14. In other embodiments, the counterweight 22 is otherwise positioned and/or at least a portion of the weight thereof is otherwise distributed throughout the vehicle 10 (e.g., on the lift base 12, on a portion of the articulable member 40, etc.). The counterweight 22 may be positioned and/or sized to counterbalance the articulable member 40 and maintain a balance of the vehicle 10 as the articulable member 40 is extended. A first end, shown as front end 20, of the lift base 12 is supported by a first plurality of tractive elements, shown as front tractive elements 16, and an opposing second end, shown as rear end 30, of the lift base 12 is supported by a second plurality of tractive elements, shown as rear tractive elements 18. According to the exemplary embodiment shown in FIG. 1, the front tractive elements 16 and the rear tractive elements 18 include wheels. In other embodiments, the front tractive elements 16 and/or the rear tractive elements 18 include a tracked element.

As shown in FIG. 1, the articulable member 40 includes a first boom section, shown as lower boom 50, and a second boom section, shown as upper boom 70. In other embodiments, the articulable member 40 includes a different number and/or arrangement of boom sections (e.g., one, three, etc.). According to an exemplary embodiment, the articulable member 40 is an articulating boom assembly. In one embodiment, the upper boom 70 is shorter in length than lower boom 50. In other embodiments, the upper boom 70 is longer in length than the lower boom 50. According to another exemplary embodiment, the articulable member 40 is a telescopic, articulating boom assembly. By way of example, the upper boom 70 and/or the lower boom 50 may include a plurality of telescoping boom sections that are configured to extend and retract along a longitudinal centerline thereof to selectively increase and decrease a length of the articulable member 40.

As shown in FIG. 1, the lower boom 50 has a first end (e.g., lower end, etc.), shown as base end 52, and an opposing second end, shown as intermediate end 54. According to an exemplary embodiment, the base end 52 of the lower boom 50 is pivotally coupled (e.g., pinned, etc.) to the turntable 14 at a joint, shown as lower boom pivot 56. The articulable member 40 includes a first actuator (e.g., pneumatic cylinder, electric actuator, hydraulic cylinder, etc.), shown as lower lift cylinder 60. The lower lift cylinder 60 has a first end coupled to the turntable 14 and an opposing second end coupled to the lower boom 50. According to an exemplary embodiment, the lower lift cylinder 60 is positioned to raise and lower the lower boom 50 relative to the turntable 14 about the lower boom pivot 56.

The upper boom 70 has a first end, shown as intermediate end 72, and an opposing second end, shown as implement end 74. According to an exemplary embodiment, the intermediate end 72 of the upper boom 70 is pivotally coupled (e.g., pinned, etc.) to the intermediate end 54 of the lower boom 50 at a joint, shown as upper boom pivot 76. As shown in FIG. 1, the articulable member 40 includes an implement or support, shown as platform assembly 92, coupled to the implement end 74 of the upper boom 70 with an extension arm, shown as jib arm 90. In some embodiments, the jib arm 90 is configured to facilitate pivoting the platform assembly 92 about a lateral axis (e.g., pivot the platform assembly 92 up and down, etc.). In some embodiments, the jib arm 90 is configured to facilitate pivoting the platform assembly 92 about a vertical axis (e.g., pivot the platform assembly 92 left and right, etc.). In some embodiments, the jib arm 90 is configured to facilitate extending and retracting the platform assembly 92 relative to the implement end 74 of the upper boom 70. As shown in FIG. 1, the articulable member 40 includes a second actuator (e.g., pneumatic cylinder, electric actuator, hydraulic cylinder, etc.), shown as upper lift cylinder 80. According to an exemplary embodiment, the upper lift cylinder 80 is positioned to actuate (e.g., lift, rotate, elevate, etc.) the upper boom 70 and the platform assembly 92 relative to the lower boom 50 about the upper boom pivot 76.

According to an exemplary embodiment, the platform assembly 92 is a structure that is particularly configured to support one or more personnel (e.g., operators, passengers, workers, individuals, etc.). In some embodiments, the platform assembly 92 includes an accessory, tool, or device (collectively referred to herein as "device 94") configured for use by a worker. In some embodiments, the device 94 may utilize electrical power and be electrically coupled to a power supply (e.g., first power supply 24 and/or second power supply 96). The device 94 may include pneumatic tools (e.g., impact wrenches, airbrushes, nail guns, ratchets, etc.), plasma cutters, welders, spotlights, controls, display screens, electrical plugs, chargers, drones, sensors, work attachments, safety equipment, blowers, a control module, hydraulic valves, lights, sensors, horns, welders, electrical plug, communication beacons, etc. In some embodiments, the platform assembly 92 may be replaced by an auxiliary component or implement at a distal end of the articulable member 40. For example, the auxiliary component may be one or more of a work platform, a work attachment, a tool attachment, and a lighting device. For example, the platform assembly 92 may be removed from the distal end of the articulable member 40 and replaced by an auxiliary component such as job-specific tool attachment, such as a work light, material (e.g., drywall) handler, winch, etc. The platform assembly 92 may be removed through the removal of one or more removable fasteners such as bolts, cams, pins, etc. In some embodiments, the platform assembly 92 includes a control panel to control operation of the vehicle 10 (e.g., the turntable 14, the articulable member 40, etc.) and/or the platform assembly 92 from the platform assembly 92. The control panel may be the device 94 and be coupled to the first power supply 24 and/or second power supply 96. In other embodiments, the platform assembly 92 includes, or is replaced with, an accessory and/or tool (e.g., forklift forks, etc.). In such embodiments, the accessory and/or tool may be the device 94.

According to an exemplary embodiment, the vehicle 10 includes the first power supply 24 that is supported by and/or within a main chassis of the vehicle 10, for example, the lift base 12. The first power supply 24 provides power to the various components of the vehicle 10 (e.g., the lower lift cylinder 60, the upper lift cylinder 80, the tractive elements 16, 18, steering actuators/motors. etc.). The first power supply 24 may supply power to the platform assembly 92 and/or the device 94 onboard the platform assembly 92. In some embodiments, the first power supply 24 includes an internal combustion engine. By way of example, the first power supply 24 may include an internal combustion engine that drives a generator to provide electrical energy. In some embodiments, the first power supply 24 includes an electrical energy storage system (e.g., a battery, a battery pack, a plurality of battery packs, etc.). In some embodiments, the first power supply 24 may be a prime mover. In other embodiments, the first power supply 24 may be coupled to a prime mover.

The vehicle 10 further includes the second power supply 96 that is supported by and/or within the platform assembly 92. Accordingly, the second power supply 96 may be positioned on a distal end of the implement end 74 of the articulable member 40. The second power supply 96 may supply power (e.g., electrical energy) directly to the platform assembly 92 and/or the device 94 without the power having to travel through the articular member 40.

Figure 2:
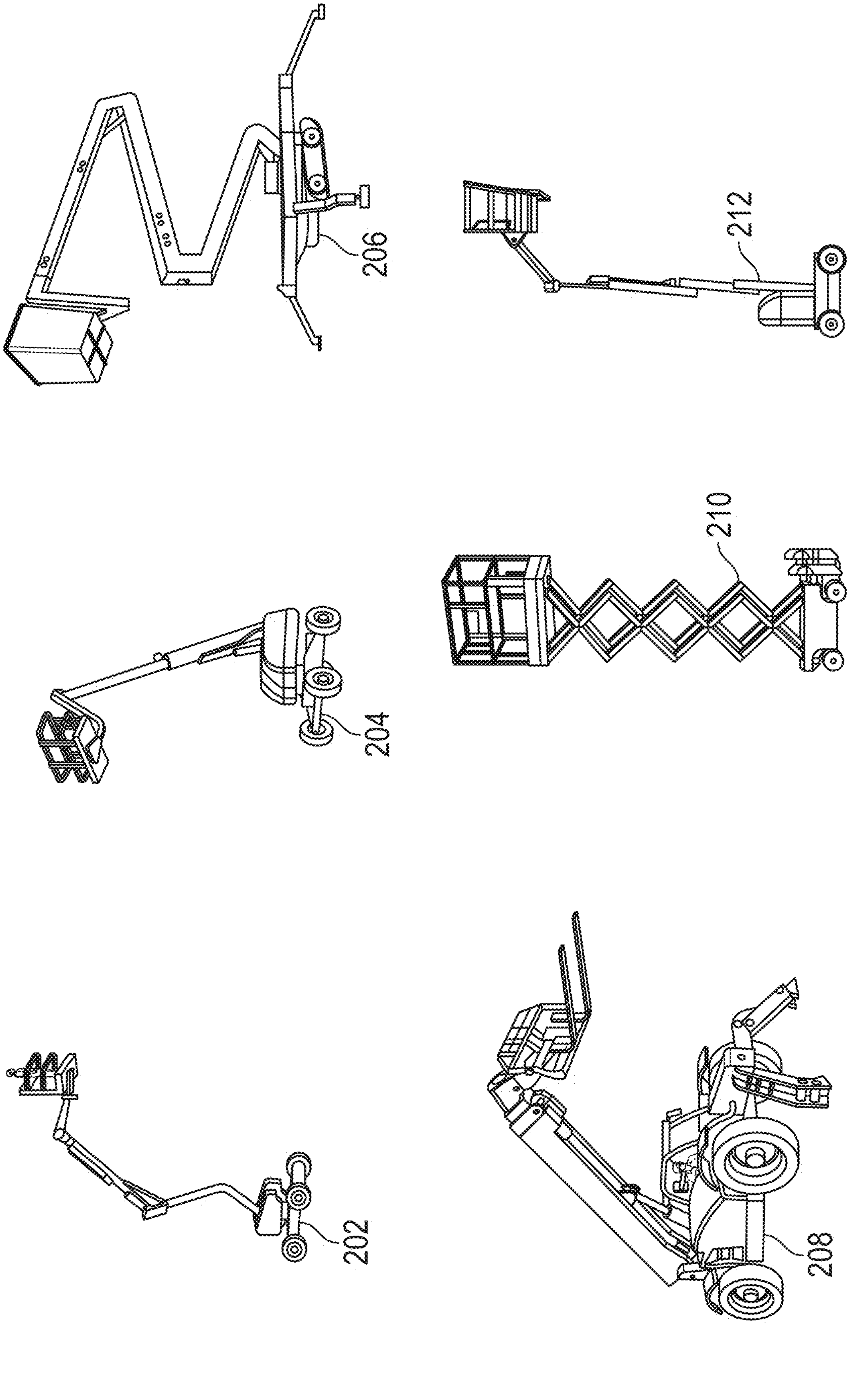
FIG. 2 depicts a side, perspective view of various lift devices, according to an exemplary embodiment.
Figure 3:
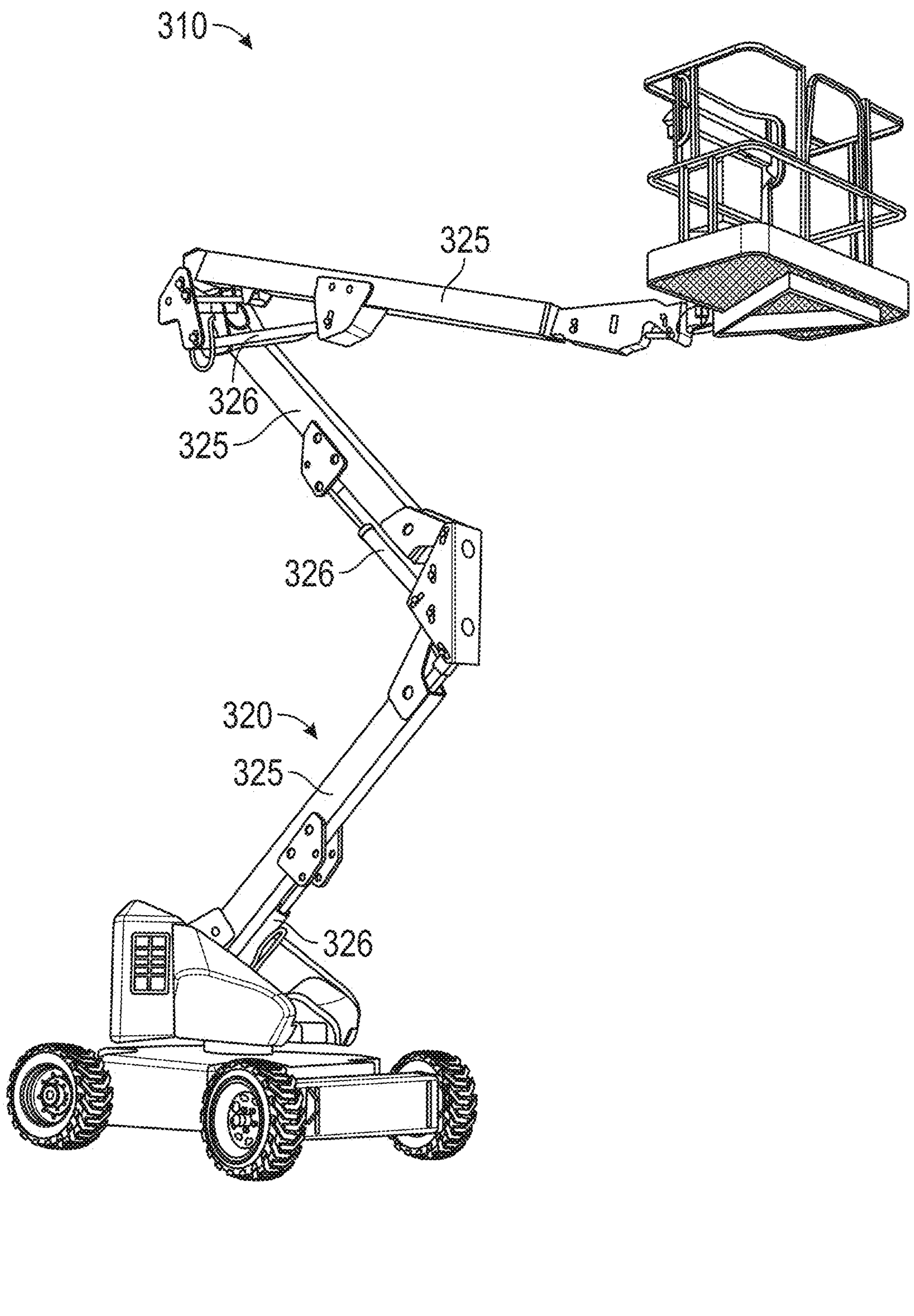
FIG. 3 depicts a side, perspective view of a vehicle in the form of a boom lift, according to an exemplary embodiment.

Turning now to FIGS. 2 and 3, alternative configurations of the vehicle 10 are shown according to various exemplary embodiments. The systems and methods described herein may be implemented using various vehicles such as an articulating boom lift 202, a telescoping boom lift 204, a compact crawler boom lift 206, a telehandler 208, a scissor lift 210, and/or a vertical lift or mast boom lift 212. By way of example, an exemplary embodiment of a work vehicle for implementing the methods and systems described herein may be a vehicle 310 of FIG. 3. Any description with respect to the vehicle 10 shown in FIG. 1 may apply to the vehicles of FIGS. 2 and 3, except as otherwise specified herein.

As shown in FIG. 3, the vehicle 310 includes a retractable lift mechanism, shown as a boom lift mechanism 320, that serves as the articulable member 40. The boom lift mechanism 320 is similarly formed of a foldable series of linked support members 325. The boom lift mechanism 320 is selectively movable or repositionable between a retracted or stowed position and a deployed or work position using a plurality of actuators 326. Each of the plurality of actuators 326 may be a linear actuator similar to the lower lift cylinder 60 of FIG. 1.

Figure 4:
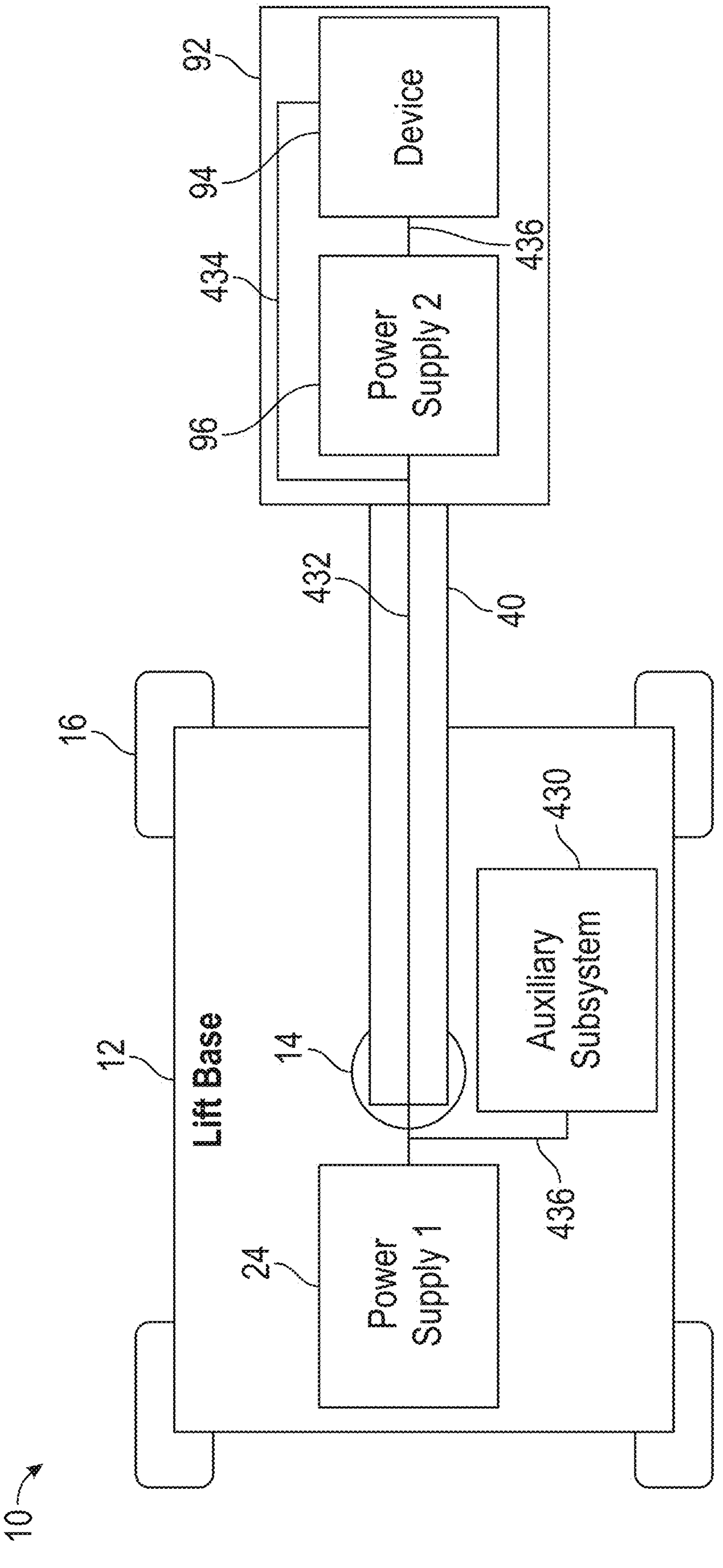
FIG. 4 is a block diagram of a vehicle with an extended power supply, according to an exemplary embodiment.

Turning now to FIG. 4, a block diagram of the vehicle 10 is shown. As described in FIG. 1, the vehicle 10 may include the lift base 12, turntable 14, the front tractive elements 16, the first power supply 24, the articulable member 40 (e.g., a boom), the device 94, and/or the second power supply 96. The various components of vehicle 10 shown in FIG. 4 are for exemplary purposes, and should in no way be considered limiting. For example, the vehicle 10 may include more or fewer components than those as shown in FIG. 4.

The first power supply 24 of the vehicle 10 may be an energy storage and/or energy conversion device. The first power supply 24 may supply electrical energy, rotational mechanical energy, pressurized fluid (e.g., hydraulic oil, air, etc.) or another type of energy. For example, the first power supply 24 may be or include a battery, a battery pack, a plurality of battery packs, etc. In some embodiments, the first power supply 24 may be an internal combustion engine, a hydrogen engine, a hydrogen fuel cell, a generator, and/or a nuclear micro-reactor. In some embodiments, the first power supply 24 may include one or more solar cells and/or other renewable energy devices. The first power supply 24 may be one or more of any combination of the above-mentioned energy storage and/or energy conversion devices.

The first power supply 24 may be coupled to the lift base 12 of the vehicle 10. However, in some embodiments, the first power supply 24 may be coupled to the vehicle 10 in a different location on the vehicle 10. For example, the first power supply 24 may be coupled to the turntable 14, the articulable member 40, one or more of the tractive elements, and/or the platform assembly 92. The first power supply 24 may be electrically coupled to an auxiliary subsystem 430, such as lighting, controls, sensors, climate control, communications, telematics, etc. through an electrical conductor 432. Alternatively or additionally, the first power supply 24 may supply electrical and/or mechanical energy to the vehicle 10. For example, through one or more electrical/mechanical connections, the first power supply 24 may cause the vehicle 10 to travel (e.g., rotate the tractive elements, such as the front tractive elements 16).

The auxiliary subsystem 430 may be a single device or a combination of one or more devices, requiring electrical power or not. The auxiliary subsystem 430 may use a low-voltage power supply (e.g., 0V-12V) or a high-voltage power supply (e.g., 12V-480V). The first power supply 24 may support both high and/or low voltage and may include a step-up and/or step-down transformer or other power conversion electronics to provide one or more voltages to one or more components of the auxiliary subsystem 430, the second power supply 96, and/or the device 94.

The first power supply 24 may be operatively coupled (e.g., electrically coupled, fluidly coupled, etc.) to the distal end of the articulable member 40 through one or more couplers (e.g., wires, cables, hoses, pipes, conduits, conductors, etc.), shown as electrical conductors 432. The electrical conductors 432 extend along the articulable member 40 from the turntable 14 to the distal end of the articulable member 40. The electrical conductors 432 may transfer energy (e.g., electrical energy, fluid power, etc.) between (a) the first power supply 24 and (b) the platform assembly 92, the device 94, and/or the second power supply 96.

The second power supply 96 may be located on an extended portion of the vehicle 10 and be configured to provide energy (e.g., during periods of peak power consumption) to one or more devices 94 that may be located at or near the extended portion of the vehicle 10 (e.g., devices 94 on the platform assembly 92). The second power supply 96 may supplement the energy supplied by the first power supply 24 to the device 94.

As shown, the second power supply 96 is directly coupled to the device 94 through an electrical conductor 436. The electrical conductor 436 may be any wired, contact, and/or wireless connection between the device 94 and the second power supply 96. For example, the electrical conductor 436 may be a wired coupling between an electrical output of the second power supply 96 and an electrical input of the device 94. Additionally or alternatively, the electrical conductor 436 may be a wireless transmitter of electrical power from the second power supply 96 to the device 94, such as by induction coils. Although the second power supply 96 is described as supplying electrical power to the device 94, it should be understood that the device 94 may additionally or alternatively supply electrical power and/or data to the second power supply 96.

Advantageously, the addition of a secondary power supply (e.g., the second power supply 96) at the remote portions of the vehicle 10 (e.g., the distal end of the boom) in addition to the first power supply 24 may permit increased power consumption by the device 94 at the remote portion of the vehicle 10 without increasing the size (e.g., diameter) of the cable routing from the first power supply 24 to the device 94. Rather, an electrical conductor 432 with a reduced diameter size may be routed from the first power supply 24 to the second power supply 96. By way of example, the usage of the device 94 may be intermittent (e.g., requiring large amounts of energy for short periods of time). If the first power supply 24 were the sole supplier of electrical energy to the device 94, the electrical conductor 432 would be sized to accommodate the peak current required by the device 94. Instead, the electrical conductor 432 may supply energy at a relatively low current to charge the second power supply 96 during times of off-peak demand (e.g., off-peak charging), gradually building charge within the second power supply 96. The second power supply 96 may supply high-current electrical energy to the device 94 without requiring the high current to be supplied through the electrical conductor 432, thereby reducing the required size of the electrical conductor 432.

In some embodiments, the first power supply transmits electrical current to the second power supply via an electrically conductive connector. The electrical current may be regulated to provide a controlled charge rate based on the current charge level of the second power supply. The electrically conductive connector coupled between the second power supply 96 and the device 94 may have a larger diameter than that coupling the first power supply 24 to the second power supply 96, thereby having a higher voltage rating and being configured to permit increased current through the connector.

During off-peak operation—such as periods when onboard devices are idle or drawing minimal current—the first power supply 24 provides a lower level of electrical current sufficient to gradually charge the second power supply 96. In contrast, during peak operation—such as activation of lighting systems, actuators, operation of welders/high voltage device, or control modules—the second power supply 96 delivers electrical current (or supplemental electrical current) directly to the devices (e.g., the device 94) at the remote portion of the vehicle 10. This supports high-power events without requiring the first power supply 24 to provide full load capacity through long-distance conductors.

The device 94 may utilize a low-voltage power supply (e.g., 0V-12V) or a high-voltage power supply (e.g., 12V-480V). The second power supply 96 may support both high and low voltage and may include a step-up and/or step-down transformer to provide one or more voltages to one or more components of the auxiliary subsystem 430, the first power supply 24, and/or the device 94.

The second power supply 96 may also include voltage and/or current filtering to provide a more consistent and/or stable supply of voltage and/or current. The second power supply 96 may include analog and/or digital voltage filters to provide consistent and reliable voltages. These filters may include one or more of a low-pass filter, high-pass filter, band-pass filter, band-stop filter, notch filter, finite impulse response filters, and/or infinite impulse response filters.

Large runs of electrical conductors may lead to increased variation in current and/or voltage at the termination of the electrical conductors and decreased output due to voltage loss. By providing a second power supply 96 at the remote portion of the vehicle 10, the second power supply 96 may serve as a buffer to these disadvantages by providing a consistent output voltage to the device 94 during peak usage. The device 94 may, in some embodiments, also be electrically coupled to the first power supply 24 as well as the second power supply 96.

The second power supply 96 may be a much smaller power supply than the first power supply 24 in size and/or electrical storage capacity. However, in some embodiments, the second power supply 96 may be the same size or larger than that of the first power supply 24. A smaller second power supply 96 may reduce a chain effect of extra costs associated with larger-diameter wire running from the first power supply 24 to the device 94. For example, increased weight of increased-diameter wiring from the first power supply 24 to the device 94 may require additional counterbalance weight, stronger articulable member 40 structure, stronger chassis, etc.

In some embodiments, the first power supply 24 may additionally or alternatively provide electrical power to the device 94 directly without the electrical energy first passing through the second power supply 96. For example, the first power supply 24 may be electrically coupled to the device 94 through an electrical conductor 434. By way of example, the electrical conductor 434 may be coupled to the first power supply 24 through the electrical conductor 432. In this configuration, the first power supply 24 may supply additional electrical power to the device 94. For example, in a situation in which the second power supply 96 does not have sufficient electrical reserves or capacity to supply the device 94 with electrical power for the required amount of time or voltage, the first power supply 24 may supplement the second power supply 96 in supplying the device 94 with electrical power. A power management system (e.g., the power supply management system 708 of FIG. 7) may determine when and how much electrical power to transmit to the device 94 from each of the first power supply 24 and/or the second power supply 96. This determination may be made by the power management system based on current charge levels in relation to predetermined threshold charge values and/or data received from the first power supply 24, the second power supply 96, and/or the device 94.

In some embodiments, data transmissions occur between the second power supply 96, the device 94, and/or the first power supply 24. For example, the device 94 may transmit data to and receive data from the second power supply 96, indicating a current power draw and/or estimated power draw in the future based on received work data, weather data, operating parameter data, current operating conditions, user data, or environmental data. For example, the device 94 may be a control panel that receives an indication that the vehicle 10 is scheduled to be used for a welding operation at an elevation in two hours. The device 94 may transmit information to the second power supply 96, requesting that the second power supply 96 have sufficient energy to support the scheduled amount of welding to be performed in two hours. The second power supply 96 may then compare the current charge level of the second power supply 96 to the requested amount from the device 94. If the current charge level of the second power supply 96 is equal to or higher than the requested amount, the second power supply 96 does not request additional charging. If the current charge level of the second power supply 96 is lower than the requested amount, the second power supply 96 requests additional (and/or accelerated) charging from the first power supply 24 such that the second power supply 96 has sufficient electrical reserves to supply to the device 94 during the scheduled work task. The work task may comprise multiple tasks over multiple time periods, which may be taken into account for the length and speed of charging requested. While the various transmissions and receptions of data are described in relation to discrete components of the vehicle 10, it should be understood that a central (or multiple) processors and/or servers may receive the described data and transmit commands to one or more of the components of the vehicle 10 (e.g., the first power supply 24, the device 94, the second power supply 96, and/or the auxiliary subsystem 430.

The second power supply 96 and/or the device 94 may communicate directly (or indirectly) with the first power supply 24 to provide instructions or request adjustments to the operation of the first power supply 24. These adjustments may include changing the time of charging from the first power supply 24 to the second power supply 96, rate of charging from the first power supply 24 to the second power supply 96, amount of electricity (e.g., voltage and/or current) to provide directly to the device 94 if applicable, etc. In some embodiments, the first power supply 24 may supply electrical power to the second power supply 96. For example, if the second power supply 96 experiences a reduction in an electrical charge and the reduced electrical charge falls below a predefined or dynamically determined threshold, the second power supply 96 may request electrical power from the first power supply 24. In some embodiments, the first power supply 24 monitors the second power supply 96 and transmits electrical power to the second power supply 96 upon the charge level falling below the threshold.

In some embodiments, the second power supply 96 may supply electrical power to the first power supply 24. For example, if the first power supply 24 experiences a reduction in an electrical charge and the reduced electrical charge falls below a predefined or dynamically determined threshold, the first power supply 24 may request electrical power from the second power supply 96. In some embodiments, the second power supply 96 monitors the first power supply 24 and transmits electrical power to the first power supply 24 upon the charge level falling below the threshold.

In some embodiments, a separate battery management system ("BMS") is used to monitor the two or more power supplies and power demand of the various devices (e.g., the device 94) and/or subsystems (e.g., the auxiliary subsystem 430).

Figure 5:
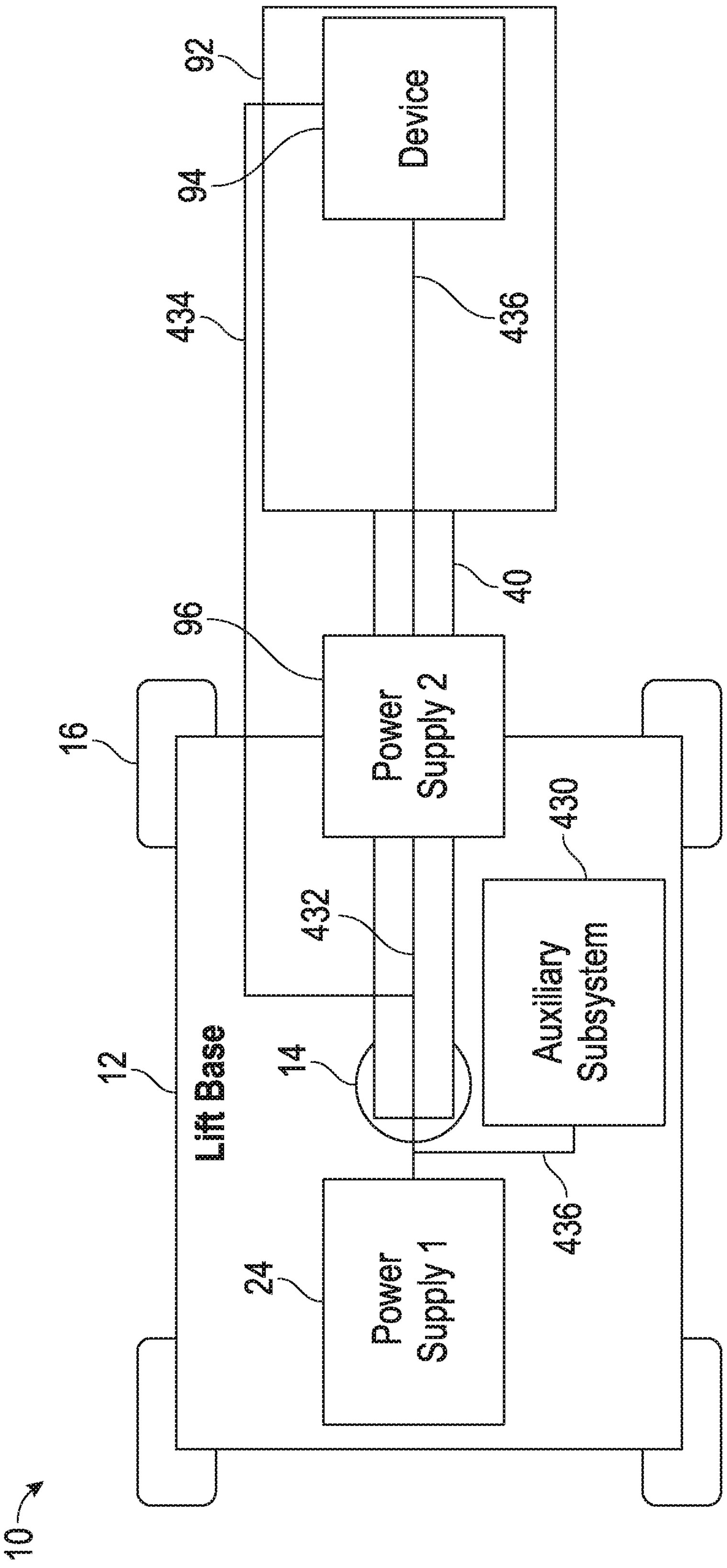
FIG. 5 is a block diagram of a vehicle with an extended power supply, according to an exemplary embodiment.

Turning now to FIG. 5, the vehicle 10 is shown in an additional or alternative configuration. The vehicle 10 of FIG. 5 may be substantially similar to the vehicle 10 of FIG. 4, except as otherwise specified herein. As shown in FIG. 5, the second power supply 96 may be placed in a location separate from the remote portion of the vehicle 10 (e.g., the platform assembly 92), yet still be electrically coupled to the device 94 that is located at the remote portion of the vehicle 10. For example, the second power supply 96 is shown as being physically coupled to the articulable member 40 and electrically coupled to the device 94 by the electrical conductor 436.

Figure 8:
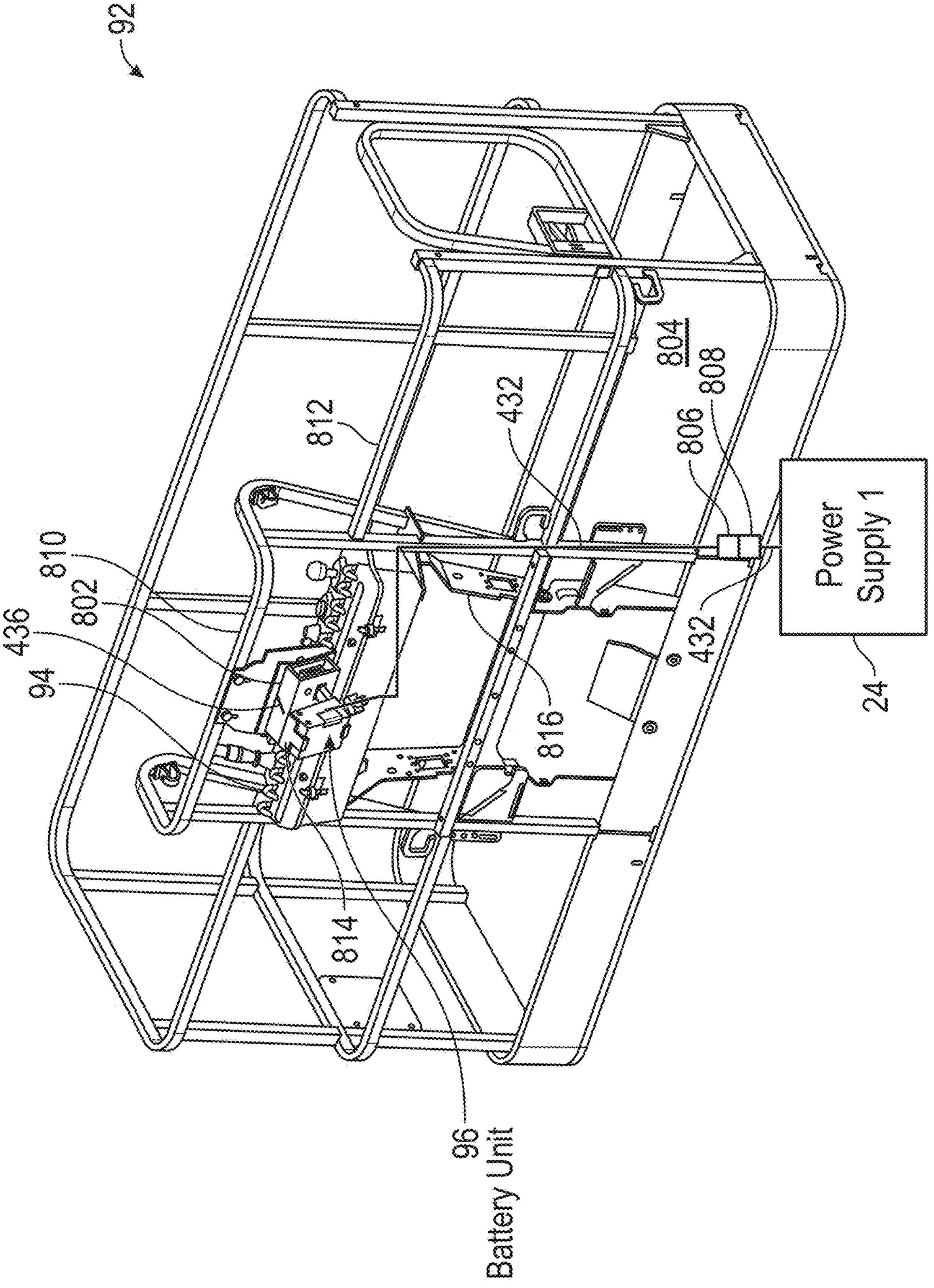
FIG. 8 is a perspective view of a remote portion of a vehicle with an extended power supply, according to an exemplary embodiment.

As shown in FIG. 5, the second power supply 96 may be located at a remote portion of the vehicle 10 (e.g., in, on, and/or near the articulable member 40) and still provide electrical power to the device 94. For example, in some embodiments, the second power supply 96 is located in the articulable member 40, and the electrical conductor 436 electrically couples the second power supply 96 to the device 94. In some embodiments, the second power supply 96 is removably coupled to the device 94 electrically. For example, the second power supply 96 may include an electrically conductive connector that may be connected and/or disconnected from the device 94 and/or the platform assembly 92 (as shown in FIG. 8). In so doing, the platform assembly 92 may be removed and/or replaced with an alternative and/or additional working implement or platform. Upon coupling the alternative and/or additional working implement or platform to the second power supply 96 by way of the electrically conductive connector, the alternative and/or additional implement or platform is then electrically coupled to the second power supply 96. In so doing, the vehicle 10 may be equipped with various remote portions and/or devices (e.g., platforms, work implements, sensors, etc.) while maintaining accurate, consistent, and reliable power from the second power supply 96.

In some embodiments, the second power supply 96 is coupled to the platform assembly 92 (as shown in FIG. 4). In such embodiments, the second power supply 96 may be removably coupled to the first power supply 24 electrically. In other words, the second power supply 96 may be decoupled from the first power supply 24, and the platform assembly 92 may be decoupled from the articulable member 40, thus permitting a separate remote portion to be coupled to the articulable member 40.

Figure 6:
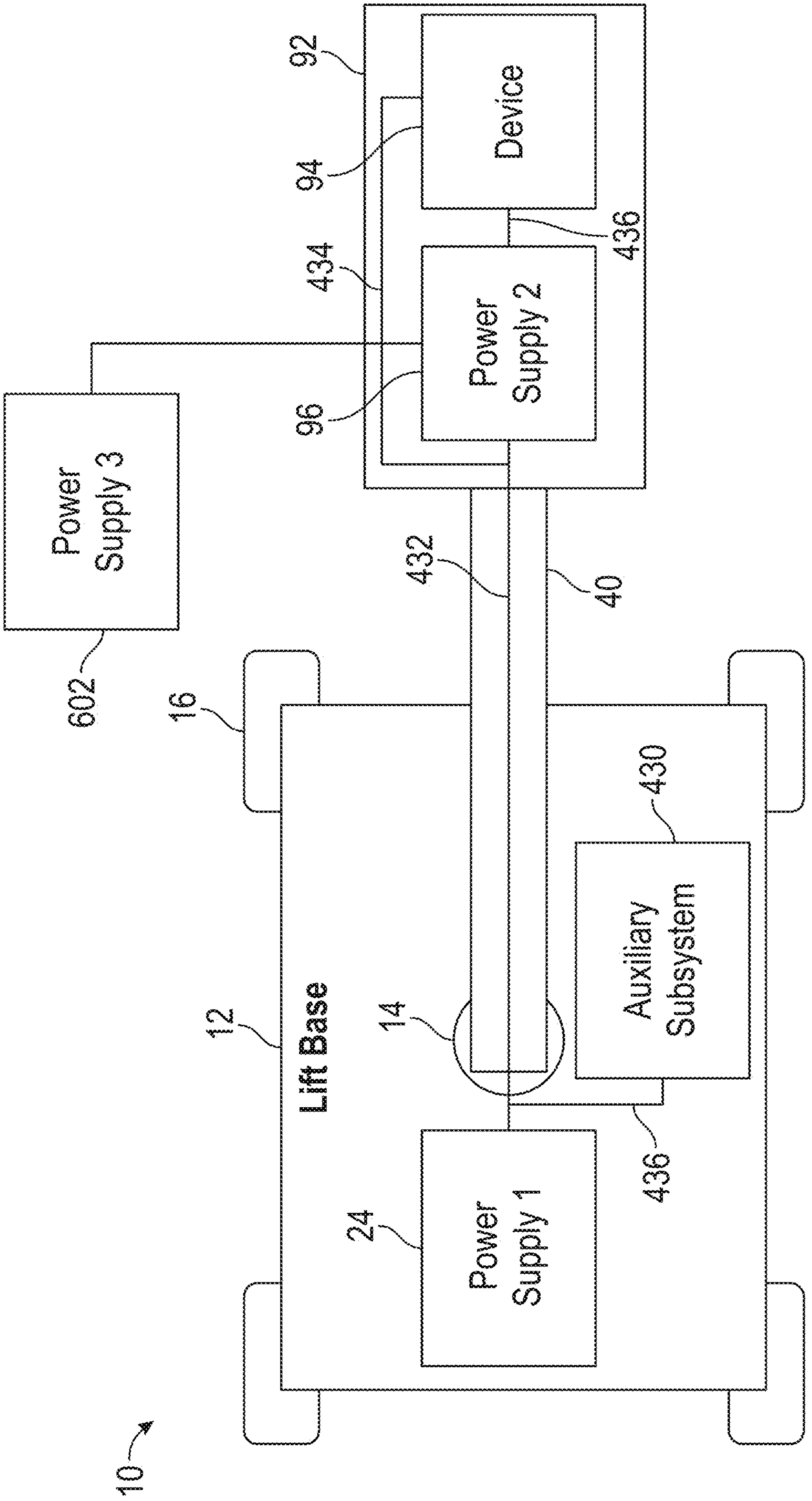
FIG. 6 is a block diagram of a vehicle with an extended power supply, according to an exemplary embodiment.

Turning now to FIG. 6, an alternative and/or additional configuration of the vehicle 10 is shown. Shown in FIG. 6 is an embodiment in which a power supply 602 (e.g., an external power supply) is shown coupled to the second power supply 96. FIG. 6 may represent an external charging or shore power configuration of the vehicle 10 of FIG. 4. It should be understood that the power supply 602 may similarly be used to supply electrical energy to the second power supply 96 of the vehicle 10 of FIG. 5. In some embodiments, the power supply 602 is removably coupled to the second power supply 96 electrically. For example, the power supply 602 may be used to charge the second power supply 96 at a charging station, such as when being charged at night and/or between jobs. The power supply 602 may be electrically decoupled from the second power supply 96 before the initiation of a job or movement of the vehicle 10. In some embodiments, the second power supply 96 remains coupled to the first power supply 24 (as shown in FIG. 6). In other embodiments, the second power supply 96 is not additionally coupled to the first power supply 24 (e.g., the second power supply 96 is electrically decoupled from the first power supply 24 before connecting to the power supply 602).

The power supply 602 may also be used to supply additional charge to the second power supply 96 and/or may supply electrical energy directly to the device 94 during prolonged usage of peak power (e.g., while the vehicle 10 is in use, while the vehicle 10 is immobile). For example, the device 94 may be a lighting device (e.g., a high-output LED lighting module). The vehicle 10 may located to provide overhead light to a worksite with the device 94 positioned above the worksite. Due to the prolonged use case and/or high power draw from the device 94, the second power supply 96 may not have sufficient electrical capacity to provide electrical power to the device 94 for the desired duration. Further, the electrical conductor 436 may not be sufficiently large to provide the required electrical input required by the device 94. Additionally or alternatively, the electrical conductor 432 may not be large enough to recharge the second power supply 96 at a fast enough rate to satisfy the power draw of the device 94. In such embodiments, the second power supply 96 may be configured such that it has an additional electrical input member to which the power supply 602 (e.g., an external power supply) may couple and thereby provide additional electrical power to the second power supply 96. The power supply 602 may be an electrical outlet from a building, a generator, an additional work vehicle, an exterior battery pack, etc. In some embodiments, multiple power supplies 602 may be daisy-chained to provide additional electrical power to the second power supply 96. For example, multiple work vehicles may be coupled together through one or more electrical conductors (e.g., wires) and electrically coupled to the electrical input at the second power supply 96.

Figure 7:
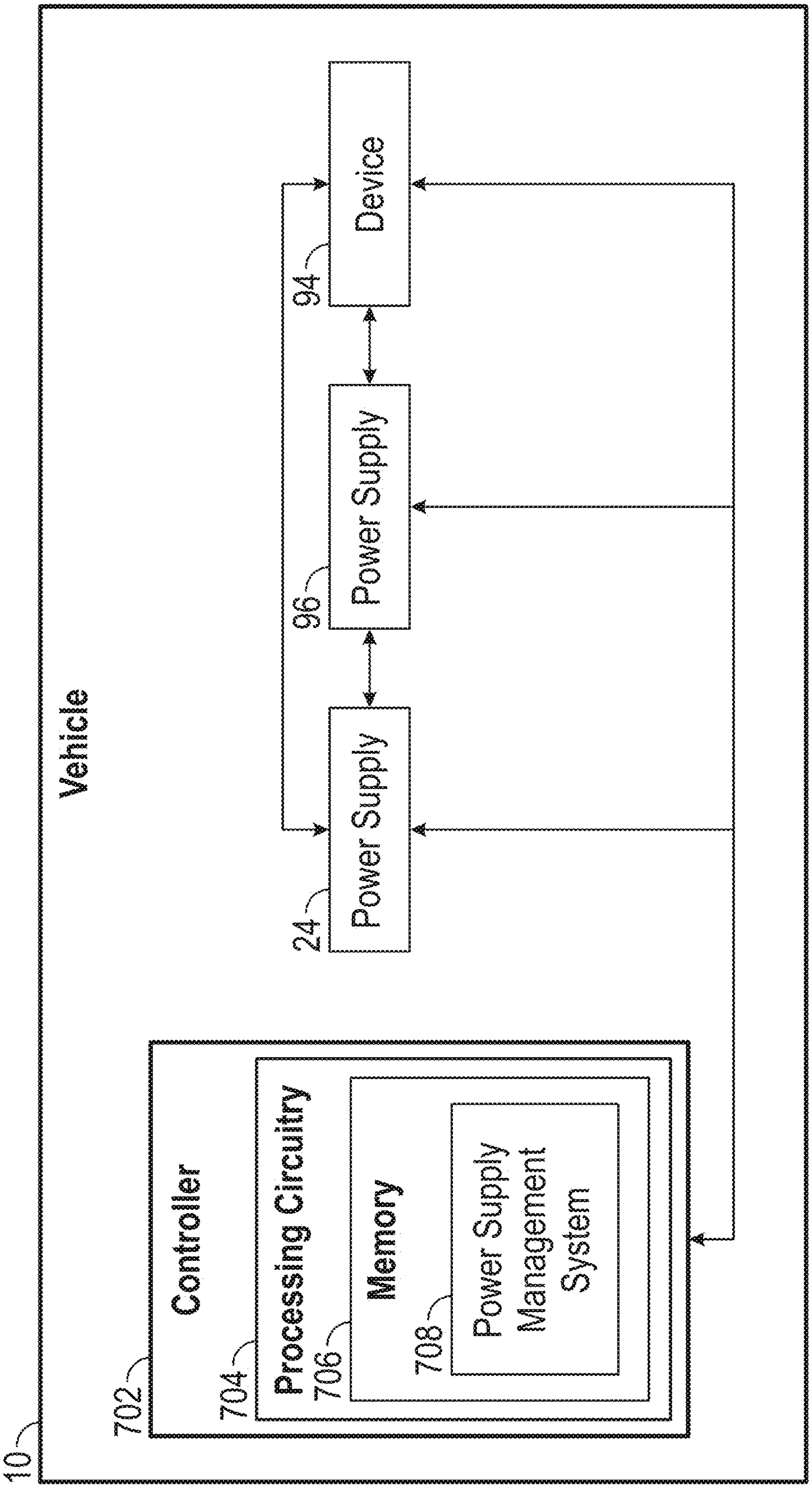
FIG. 7 is a block diagram of a vehicle with an extended power supply, according to an exemplary embodiment.

Turning now to FIG. 7, a block diagram of one or more components of the vehicle 10 is illustrated. The vehicle 10 may include a controller 702 which includes one or more of a processing circuitry 704, a memory 706, and/or a power supply management system 708. The vehicle 10 may additionally or alternatively include a first power supply 24, a second power supply 96, and/or a device 94. The controller 702 may be positioned on the lift base 12, the turntable 14, the articulable member 40, the platform assembly 92, or elsewhere on the vehicle 10. In other embodiments, the functionality of the controller 702 is distributed across multiple devices that cooperatively act as the controller 702.

The processing circuitry 704 may be a general purpose or specific purpose processor, an application specific integrated circuit (ASIC), one or more field programmable gate arrays (FPGAs), a group of processing components, or other suitable processing components. The processing circuitry 704 may be configured to execute computer code or instructions stored in memory 706 or received from other computer readable media (e.g., CDROM, network storage, a remote server, etc.) to perform one or more of the processes described herein. The memory 706 may include one or more data storage devices (e.g., memory units, memory devices, computer-readable storage media, etc.) configured to store data, computer code, executable instructions, or other forms of computer-readable information. The memory 706 may include random access memory (RAM), read-only memory (ROM), hard drive storage, temporary storage, non-volatile memory, flash memory, optical memory, or any other suitable memory for storing software objects and/or computer instructions. The memory 706 may include database components, object code components, script components, or any other type of information structure for supporting the various activities and information structures described in the present disclosure. The memory 706 may include computer code for executing (e.g., by processing circuitry 704, etc.) one or more of the processes described herein.

The memory 706 is described below as including one or more modules. While the exemplary embodiment shown in the figures shows a single power supply management system 708, it should be understood that, in various other embodiments, the memory may include more, fewer, or altogether different modules. For example, the structures and functions of one module may be performed by another module, or the activities of two modules may be combined such that they are performed by only a signal module.

The controller 702 may also include a communications module (e.g., a communication circuit or communication interface) which is configured to facilitate wireless communications with external computing systems and with other vehicles via a communications interface (e.g., a transceiver, etc.). The communications interface may support any kind of wireless standard (e.g., 802.11b/g/n, 802.11a, etc.) and may interface with any type of external computing system wireless communication capability (e.g., cellular, Wi-Fi, etc.). The communications interface may further facilitate wireless communications with an external global positioning system (GPS). The communications module may be any type of capable module (e.g., a CL-T04 CANect® Wi-Fi Module manufactured by HED Inc., etc.) configured to support wireless communications with the external computing systems and other response vehicles. In one embodiment, the external computing systems communicate with the response vehicles via Wi-Fi. In other embodiments, the communications between the external computing systems and/or response vehicles may be supported via CDMA, GSM, or another cellular connection. In still other embodiments, another wireless protocol is utilized (e.g., Bluetooth, Zigbee, radio, etc.).

The power supply management system 708 may be configured to provide/receive instructions to/from the first power supply 24, the second power supply 96, and/or the device 94. For example, in some embodiments, the power supply management system 708 may be used to receive power demand requests and/or voltage/current draws from the device 94, the first power supply 24, and/or the second power supply 96. Using this received information, the power supply management system 708 may transmit control signals to the first power supply 24 and/or the second power supply 96 to provide instructions to cause the first power supply 24 and/or the second power supply 96 to transmit electrical power to the device 94, the first power supply 24, and/or the second power supply 96.

The power supply management system 708 may be configured to coordinate electrical transmission between the one or more components of the vehicle 10. The power supply management system 708 may be used to ensure the safe and/or efficient performance of the first power supply 24 and/or the second power supply 96. The power supply management system 708 may be used receive data signals from the first power supply 24, the second power supply 96, and/or the device 94 and thereby monitor various parameters, including the voltage, current, and/or temperature of individual cells or modules within the first power supply 24 and/or the second power supply 96. By tracking these parameters, the power supply management system 708 can prevent conditions that might lead to overcharging, over-discharging, or overheating, which could damage the battery or pose safety risks. For example, during charging of the second power supply 96 from the first power supply 24 and upon receiving temperature data from the second power supply 96 that corresponds to an operating temperature of the second power supply 96, and the operating temperature exceeding a safe operating threshold, the power supply management system 708 may transmit instructions to the 24 to stop transmitting electrical power from the first power supply 24 to the second power supply 96.

In a multi-cell power supply configuration, variations in cell characteristics can lead to some cells charging or discharging faster than others. This imbalance can reduce the overall efficiency and lifespan of the battery pack. The power supply management system 708 employs balancing techniques to equalize the state of charge across all cells for uniform performance and longevity. In some embodiments, the power supply management system 708 provides/receives data and diagnostics to/from the first power supply 24, the second power supply 96, and/or the device 94. This data can be used to predict the remaining battery life, schedule maintenance, and optimize the usage patterns to extend the power source's service life.

The power supply management system 708 may include mechanisms to protect against potential hazards. These mechanisms can include isolating the first power supply 24 and/or second power supply 96 in the event of a fault, managing thermal conditions to prevent overheating, and ensuring that the power supply operates within its safe voltage and current limits. The power supply management system 708 can also communicate with other components, such as the vehicle 10 controls, to coordinate energy usage and overall system performance.

Additionally or alternatively, the power supply management system 708 manages the charging rate and/or time and/or amount between the power supplies (e.g., the first power supply 24 and the second power supply 96).

FIG. 8 illustrates a perspective view of the platform assembly 92, according to some embodiments. As described herein, the platform assembly 92 is an exemplary auxiliary component. In some embodiments, the platform assembly 92 is removably coupled to the articulable member 40 (as shown in FIG. 7). The platform assembly 92 may include the device 94, such as a control panel. For example, the control panel may receive user input through one or more user input devices (e.g., a lever, a mouse, a keyboard, a button, a touch screen, a knob, etc.). The user inputs may transmit data to the first power supply 24, the second power supply 96, and/or the device 94 that is indicative of one or more adjustments to make to, for example, the operating parameters of the vehicle 10 and/or the platform assembly 92. As described herein, the device 94 may receive electrical power from the second power supply 96 through the electrical conductor 436. The electrical conductor 436 may be an electrically conductive material such as copper, and surrounded by an electrically non-conductive sheathing. Though the electrical conductor 436 is shown as a single member, it should be understood that the electrical conductor 436 may include multiple parts, components, and/or systems. For example, electrical conductor 436 may include additional electrical filtering components.

Though the second power supply 96 is illustrated as having a definite shape and size and positioned at a particular location, it is understood that the second power supply 96 may be any suitable size larger or smaller than that illustrated in FIG. 8. Likewise, the second power supply 96 may be located in various locations on or near the platform assembly 92. For example, the second power supply 96 may have one or more mounting features (e.g., brackets, housing, holes, slots, bolts, adhesives, provisions) that may be used to mount or otherwise couple the second power supply 96 to the platform assembly 92. In some embodiments, such as shown in FIG. 8, the second power supply 96 may be coupled to the device 94 via a mounting bracket 802. The mounting bracket 802 may be bolted to the second power supply 96, the device 94, and/or the platform assembly 92. In some embodiments, the second power supply 96 is located within or under a base 804 of the platform assembly 92. For example, the base 804 may have a cavity within the base 804 in which the second power supply 96 may be located, the cavity formed by one or more side walls and/or one or more of a top and bottom wall. The electrical conductor 436 may route from the second power supply 96 positioned in the base 804 of the platform assembly 92 to the device 94.

In some embodiments, the second power supply 96 is coupled to the mounting bracket 802 by way of one or more fasteners, adhesives, and/or friction-fit snap mounts 814. The mounting bracket 802 may be coupled additionally and/or alternatively to a railing 810 of the platform assembly 92 so as to mount the second power supply 96 to the device platform assembly 92. The railing 810 may extend around the device 94 to provide protection for the device 94 and/or the second power supply 96. Though the second power supply 96 is shown as being coupled to the railing 810 by the mounting bracket 802, the second power supply 96 may alternatively and/or additionally be mounted to a railing 812. The mounting bracket 802 may position the second power supply 96 outside an enclosure of the platform assembly 92 formed by one or more railings 812 and/or the base 804. As shown in FIG. 8, the second power supply 96 may be located in the mounted position above the railing 812. In other embodiments, the second power supply 96 may be positioned on a device enclosure 816. The device enclosure 816 may be a formed sheet metal enclosure that protects at least a portion of the device 94.

The second power supply 96 may be located off the platform assembly 92 or another auxiliary component. For example, the 96 may be coupled to the articulable member 40. In some embodiments, the second power supply 96 is housed within an exterior surface of the articulable member 40, such as in an internal cavity of the articulable member 40, thereby providing a protected position from external damage while maintaining a configurable implementation that allows for various auxiliary components. The electrical conductor 436 may include, for example, an electrical connection member (e.g., a plug) that may be selectively coupled and/or decoupled from the corresponding electrical connection member such that the second power supply 96 may be decoupled from the device 94 and/or platform assembly 92 during removal or replacement of the platform assembly 92 and/or device 94.

In some embodiments, the electrical conductor 432, which electrically couples the second power supply 96 to the first power supply 24, may additionally or alternatively include an electrical connector 806. The electrical connector 806 may correspond and electrically and/or physically interface with a corresponding electrical connector 808 so as to provide a secure electrical and/or physical connection between the electrical connector 806 and the corresponding electrical connector 808. The electrical connector 806 may be selectively coupled and/or decoupled from the corresponding electrical connector 808 to allow for the removal of the platform assembly 92 from the articulable member 40. The electrical connector 806 may electrically interface (e.g., wired and/or wirelessly) with the corresponding electrical connector 808, thus allowing transmission of electrical power along the electrical conductor 432 between the second power supply 96 and the first power supply 24 to provide charging of the second power supply 96 and/or electrical power for the device 94.

In some embodiments, the second power supply 96 is electrically uncoupled from an on/off switch of the vehicle 10. For example, the second power supply 96 may be operationally independent of a current operating state of the vehicle 10 and/or the first power supply 24. In some implementations, when the vehicle 10 is in an off state (e.g., a key is turned to the "Off" position), the second power supply 96 may still provide electrical power to the device 94.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single-or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is coupled to the processor to form a processing circuit and includes computer code for executing (e.g., by the processor) the one or more processes described herein.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A work vehicle comprising:
a chassis;
a tractive element;
an articulating boom having a first end coupled to the chassis;
a platform assembly coupled to the articulating boom at a second end;
a device coupled to the platform assembly;
a first power supply coupled to the chassis and configured to power at least the tractive element; and
a second power supply coupled to the articulating boom and configured to power the device, wherein the second power supply is electrically coupled to the first power supply by a first electrically conductive connector, wherein the first power supply charges the second power supply by the first electrically conductive connector, and wherein the second power supply is configured to removably couple with a third power supply external to the work vehicle to electrically charge the second power supply.

2. The work vehicle of claim 1, further comprising a second electrically conductive connector electrically coupling the second power supply to the device, the second electrically conductive connector having a higher voltage rating than the first electrically conductive connector.

3. The work vehicle of claim 1, wherein the second power supply is configured to provide electrical power to the device independent of an operating state of the first power supply.

4. The work vehicle of claim 1, wherein the second power supply is coupled to a distal end of the articulating boom.

5. The work vehicle of claim 1, wherein the second power supply provides electrical power to the device for peak electrical loads and the first power supply provides electrical power to the second power supply to charge the second power supply upon a reduction in an electrical charge of the second power supply below a threshold.

6. The work vehicle of claim 1, wherein the device is electrically coupled to the first power supply to provide power to the device during off-peak operation, and wherein the device is electrically coupled to the second power supply to provide power to the device during peak operation.

7. The work vehicle of claim 1, wherein the device is electrically coupled to the first power supply and the second power supply.

8. The work vehicle of claim 1, wherein the device is at least one of a control module, a display screen, a hydraulic valve, a light, a sensor, a tool, an actuator, a horn, a beacon, a welder, or an electrical plug.

* * * * *